United States Patent
Scholpp

(10) Patent No.: US 7,626,130 B2
(45) Date of Patent: Dec. 1, 2009

(54) CHECK WEIGHER WITH HOLLOW BODY AND MOUNTING FLANGE

(75) Inventor: Werner Scholpp, Oberriexingen (DE)

(73) Assignee: Sartorius Mechatronics C & D GmbH & Co. KG (DE)

( * ) Notice: Subject to any disclaimer, the term of this patent is extended or adjusted under 35 U.S.C. 154(b) by 0 days.

(21) Appl. No.: 11/884,102

(22) PCT Filed: Feb. 1, 2006

(86) PCT No.: PCT/DE2006/000145

§ 371 (c)(1),
(2), (4) Date: Aug. 9, 2007

(87) PCT Pub. No.: WO2006/084431

PCT Pub. Date: Aug. 17, 2006

(65) Prior Publication Data

US 2008/0078589 A1    Apr. 3, 2008

(30) Foreign Application Priority Data

Feb. 9, 2005    (DE) .................. 10 2005 006 002

(51) Int. Cl.
*G01G 21/28* (2006.01)
(52) U.S. Cl. .................. 177/238; 177/244; 248/250; 248/235; 312/281
(58) Field of Classification Search .............. 248/250, 248/235; 312/281; 177/238, 244
See application file for complete search history.

(56) References Cited

U.S. PATENT DOCUMENTS

| | | | | |
|---|---|---|---|---|
| 2,127,967 A | * | 8/1938 | Thomas | 312/281 |
| 2,572,617 A | * | 10/1951 | Haury et al. | 361/829 |
| 3,785,447 A | * | 1/1974 | Blackerby | 177/119 |
| 4,582,151 A | * | 4/1986 | Mairot et al. | 177/144 |
| 5,294,756 A | * | 3/1994 | Lauber et al. | 177/119 |
| 5,364,055 A | * | 11/1994 | Abinanti | 248/316.1 |
| 6,803,529 B2 | * | 10/2004 | Takahashi | 177/119 |

FOREIGN PATENT DOCUMENTS

| | | |
|---|---|---|
| EP | 1 416 256 A1 | 10/2003 |
| WO | WO 2004/102135 A1 | 11/2004 |

* cited by examiner

*Primary Examiner*—Randy W Gibson
(74) *Attorney, Agent, or Firm*—David C. Purdue

(57) ABSTRACT

The invention relates to a check weigher comprising a machine body consisting of a front clamping plate and a rear hollow body which is fixedly or detachably connected to said clamping plate and is preferably used as a cabinet for receiving necessary electric and electronic components. The clamping plate is projected on all sides across the hollow body, thereby forming a fastening flange. The outer edge of said fastening flange is provided with a recessed and projected contour which is subdivided into any grid and enables to obtain a positive or non-positive secure connection of accessories with the machine body by means of two clamping plates having a corresponding contour and fixedly connected to a holding plate and additional clamping elements.

18 Claims, 4 Drawing Sheets

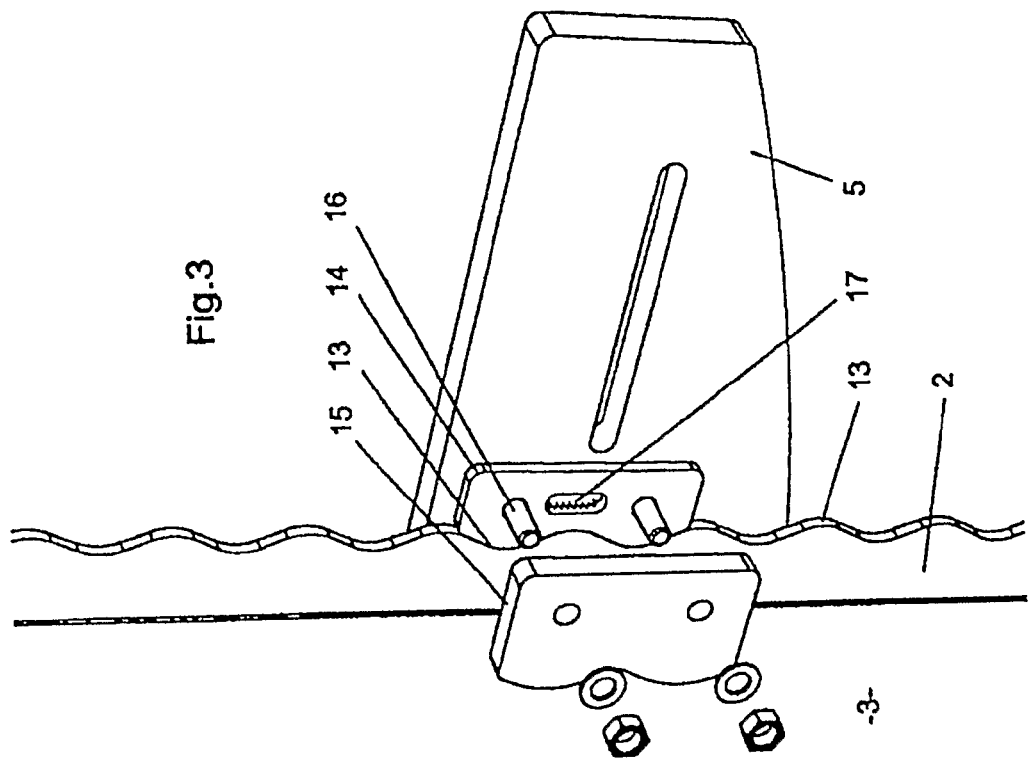
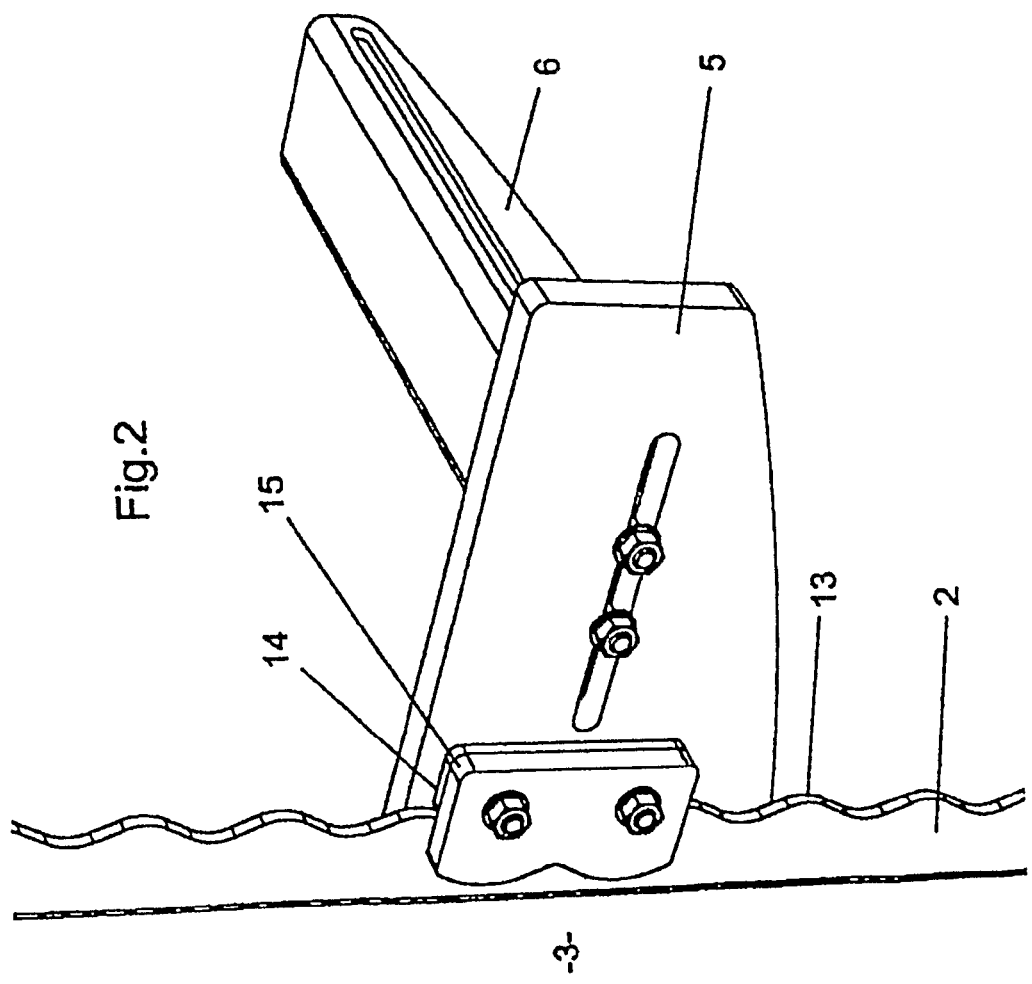

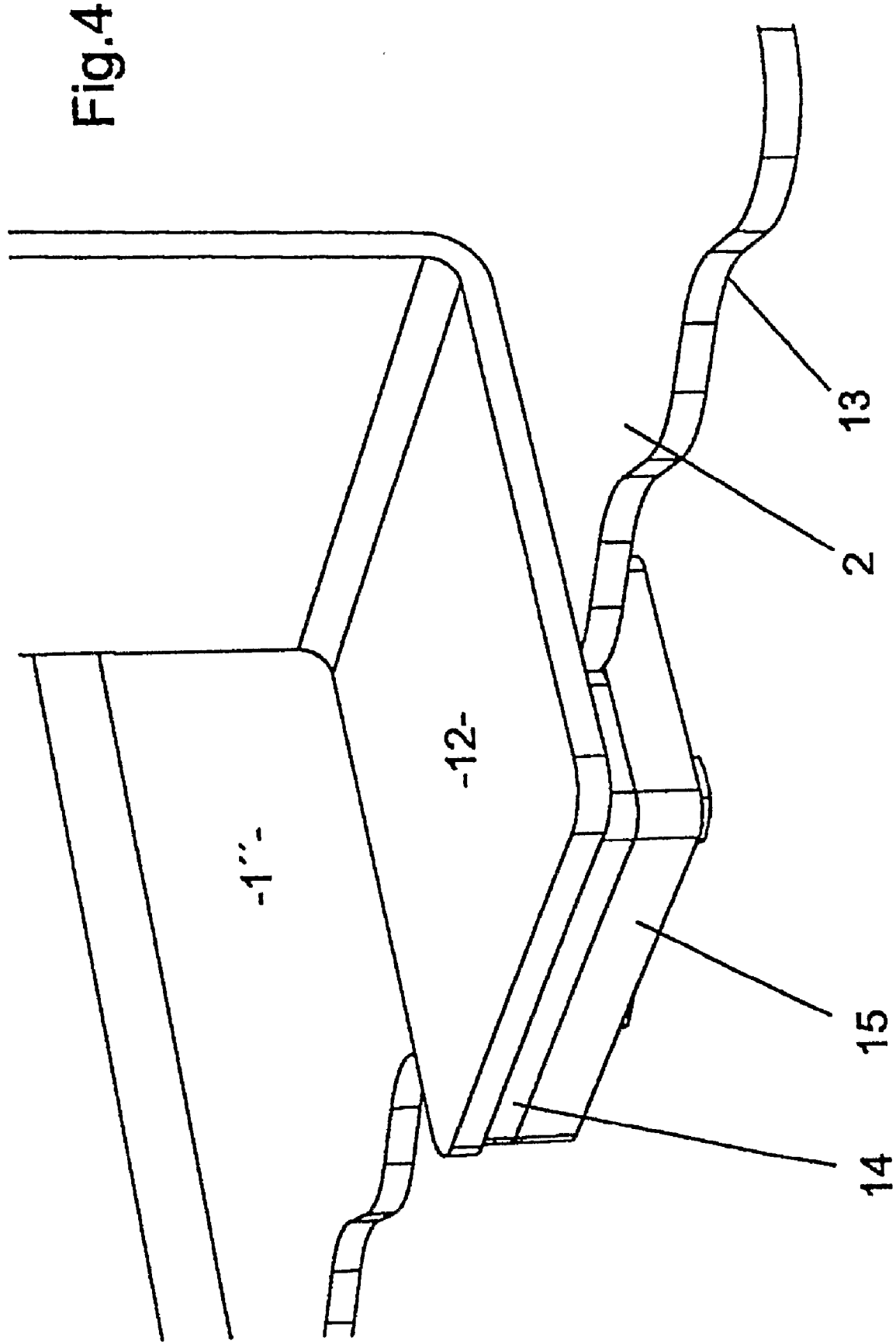

CHECK WEIGHER WITH HOLLOW BODY AND MOUNTING FLANGE

The invention relates to a check weigher with a machine body.

Check weighers are known which consist of an essentially L-shaped machine body and of weighing and transport tables which are mounted at varying height on the vertical part of the machine body by means of a clamping or screw fastening. Since the accuracy of these weighers is influenced very highly by rigidity and freedom from play, a connection technique of this type has disadvantages. Moreover, this design gives rise to inaccessible gaps which cannot be cleaned properly, this being a disadvantage particularly in check weighers which are to be used in the food sector or in the pharmaceutical industry.

The object on which the present invention is based is to provide a check weigher, the weighing and transport tables of which can be fastened exactly to the machine body by means of an improved connection technique, so that the abovementioned disadvantages are avoided. Furthermore, the possibly is also to be afforded of being able to fix further components to the machine body in a flexible way.

The object is achieved in that the machine body consists of a rear-side hollow body and of a front-side mounting plate which projects, at least in places, beyond the hollow body, at least on two sides lying opposite one another, and thus forms a fastening flange. In this case, the hollow body consisting, for example, of sheet metal may be used as a cabinet for accommodating the required electrical and electronic components. The fastening flange occurring due to the projecting mounting plate preferably consisting of a thick-walled sheet metal part and connected releasably or unreleasably to the hollow body can be used for the flexible fixing of any desired components. These include, for example, weighing and transport tables or other measuring or auxiliary devices.

The check weigher may also be designed such that an assembly plate is fastened releasably to the fastening flange by means of clamping elements, the assembly plate and the clamping elements clamping between them the fastening flange at fastening points on two sides of the fastening flange which lie opposite one another. The assembly plate thus serves as a base for components to be attached to and can be fixed flexibly and reliably to the fastening flange by means of the clamping elements provided.

According to a preferred embodiment of the check weigher according to the invention, the fastening flange possesses on its circumference a contour projecting and set back in any desired modular dimension. This contour may advantageously be used, in particular, in the embodiments described below.

According to a further embodiment, for each fastening point, a holding element fixed to the assembly plate is provided, which, with the assembly plate fastened, butts against the circumference of the fastening flange. In this case, it may be advantageous if the holding elements possess a contour which cooperates with the contour of the fastening flange. This brings about a nonpositive and/or positive connection of the holding elements to the fastening flange. Particularly in conjunction with a projecting and setback contour of the fastening flange, the assembly plate is then fixed to the fastening flange in a stable manner and so as to be secured against displacement.

Further embodiments of the check weigher according to the invention are given in subclaims 7 to 10.

The invention is explained in more detail below with reference to drawings in which:

FIG. 2 shows a perspective view of a detail of the check weigher which shows the fastening flange, the assembly plate, the holding plate and the clamping element according to the invention.

FIG. 3 shows a perspective view of a detail of the check weigher which shows the fastening flange, the assembly plate, the holding plate and the moved-away clamping element according to the invention.

FIG. 4 shows a perspective view of a detail of the check weigher which shows the horizontal mounting plate, the fastening flange, a supporting element, the holding plate and the clamping element according to the invention.

Figure 1:
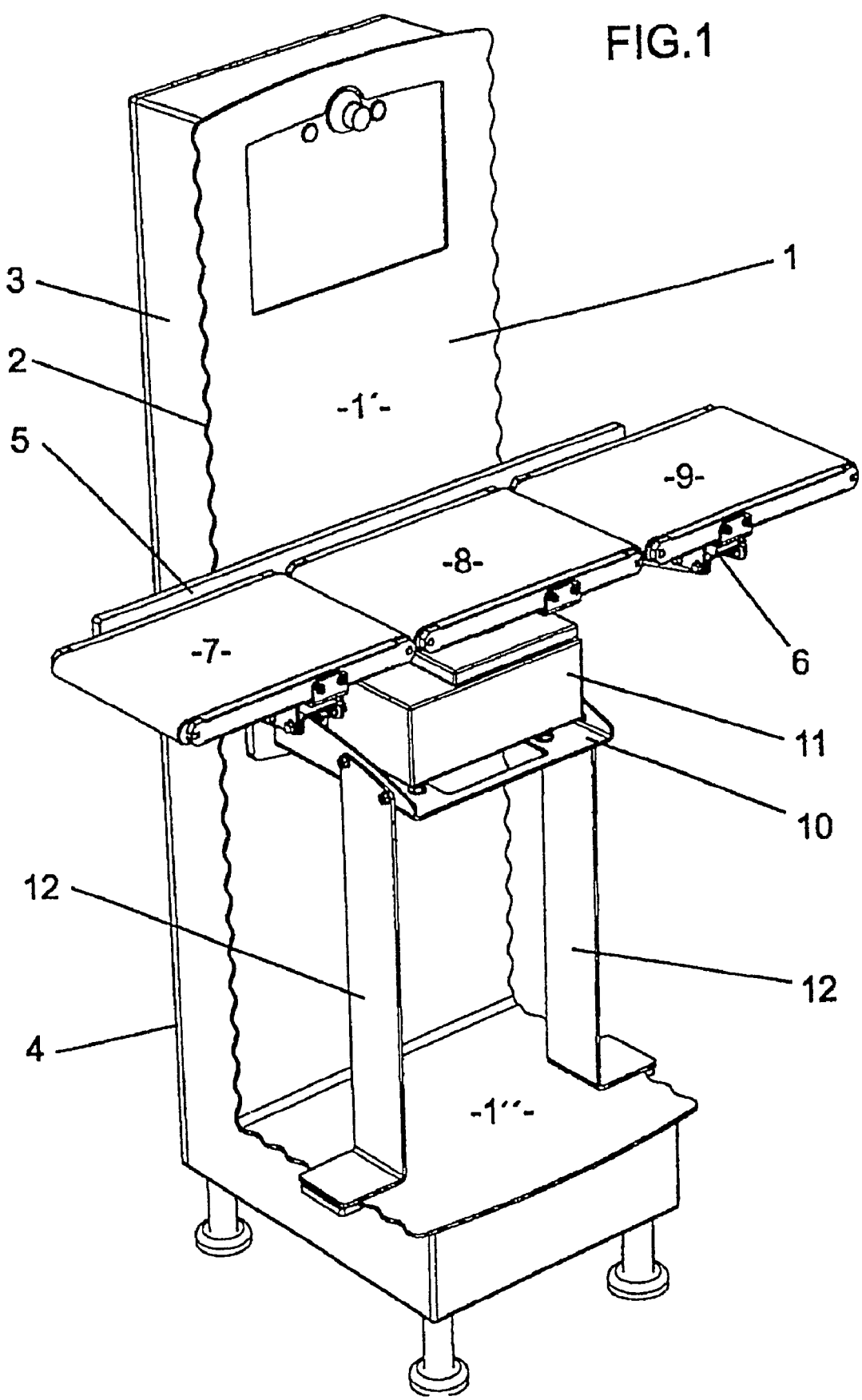
FIG. 1 shows a perspective view of the check weigher according to the invention obliquely from the front.

The check weigher is shown by way of example in FIG. 1. It consists of a mounting plate 1 with a fastening flange 2, which mounting plate preferably possesses a vertical leg 1' and a horizontal leg 1", and of a sheet metal hollow body 3 connected releasably or unreleasably to the mounting plate 1 and having a rear door 4. An assembly plate 5 is fastened to the vertical leg 1' of the mounting plate 1 by means of fastening elements, not shown here, and carries two conveyor belt brackets 6 on which the conveyor belts 7 and 9 are mounted, and also a weighing cell bracket 10. The latter carries the weighing cell 11 with the conveyor belt 8 and may optionally be connected to the horizontal leg 1" of the mounting plate by means of supporting struts 12.

FIG. 2 shows a detail which reveals the fastening of the assembly plate 5 to the fastening flange 2 and its contour 13. This purpose is served by a holding plate 14 which is connected preferably unreleasably to the assembly plate 5 and of which the contour 13', which cannot be seen here, is congruent with the contour 13 of the fastening flange 2. Said holding plate absorbs, free of play, the vertical forces. A clamping element 15 serves, together with screws and nuts, for the releasable connection which may take place in any position of the predetermined modular dimension of the contour 13.

FIG. 3 shows the same parts as FIG. 2, but, for greater clarity, the clamping element 15, together with the nuts and washers, is moved away in the direction of the screw axes. The screws 16 are optimally welded to the assembly plate 5 and pass through the holding plate 14 which likewise possesses a welded connection 17 to the assembly plate 5.

FIG. 4 shows in detail the connection of the supporting element 12 to the fastening flange 2 on the horizontal leg 1" of the mounting plate 1. Here, too, the connection takes place by means of the holding plate 14 and clamping element 15, the contour 13 allowing exact positioning.

Figure 5:
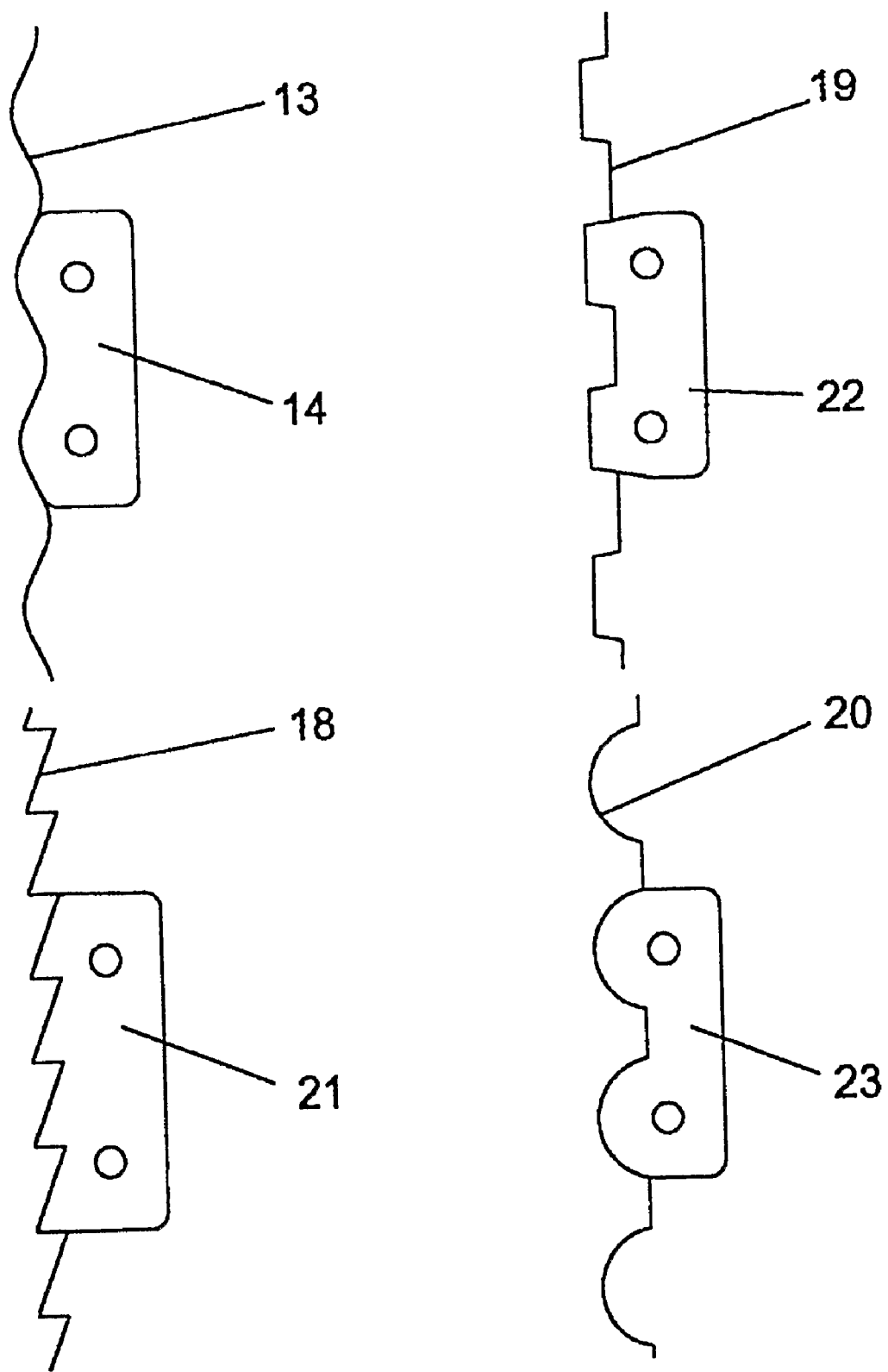
FIG. 5 shows details of the check weigher which show various versions of the contour of the fastening flange.

FIG. 5 shows four different contours of the fastening flange and holding plates, which contours serve for positive and/or nonpositive connection in the vertical direction: contour 13 with holding plate 14 consists of arcs of a circle and straight lines merging one into the other or has a sinusoidal profile, contour 18 with holding plate 21 consists of sawtooth-shaped straight lines, contour 19 with holding plate 22 shows a trapezoidal line, while contour 20 with holding plate 23 is formed from angularly connected arcs of a circle and straight lines.

LIST OF REFERENCE SYMBOLS

1 Mounting plate
1', 1" Vertical and horizontal leg of the mounting plate
2 Fastening flange
3 Sheet metal hollow body
4 Door 5 Assembly plate
6 Conveyor belt brackets
7, 8, 9 Conveyor belts.
10 Weighing cell bracket
11 Weighing cell
12 Supporting struts
13, 18, 19, 20 Contours of the fastening flange
14, 21, 22, 23 Holding plates
13', 18', 19', 20' Contours of the holding plates
15 Clamping element
16 Screws
17 Welded connection

The invention claimed is:

1. A check weigher with a machine body and with a weighing cell (11) fastened to the machine body, characterized in that the machine body consists of a rear-side hollow body (3) and of a front-side mounting plate (1) which projects, at least in places, beyond the hollow body (3), at least on two sides lying opposite one another, and thus forms a fastening flange (2), the weighing cell (11) being secured releasably to the fastening flange (2) on the front side of the mounting plate (1), said front side facing away from the hollow body (3).

2. The check weigher as claimed in claim 1, characterized in that the hollow body (3) is connected unreleasably to the mounting plate (1).

3. The check weigher as claimed in claim 1, characterized in that an assembly plate (5) is fastened releasably to the fastening flange (2) by means of clamping elements (15), the assembly plate (5) and the clamping elements (15) clamping between them the fastening flange (2) at fastening points on two sides of the fastening flange (2) which lie opposite one another.

4. The check weigher as claimed in claim 1, characterized in that the fastening flange (2) possesses on its circumference a contour (13, 18, 19 or 20) projecting and set back in any desired modular dimension.

5. The check weigher as claimed in claim 3 or 4, characterized in that, for each fastening point, a holding element (14, 21, 22 or 23) fixed to the assembly plate (5) is provided, which, with the assembly plate (5) fastened, butts against the circumference of the fastening flange (2).

6. The check weigher as claimed in claim 5, characterized in that the holding element (14, 21, 22 or 23) possess a contour (13', 18', 19' or 20') which cooperates with the contour (13, 18, 19 or 20) of the fastening flange (2).

7. The check weigher as claimed in claim 3, characterized in that the assembly plate (5) possesses perforations at which conveyor belt brackets (6) are fastened releasably and adjustably.

8. The check weigher as claimed in claim 3, characterized in that a weighing cell bracket (10) which carries a weighing cell (11) is fastened releasably to the assembly plate (5).

9. The check weigher as claimed in claim 3, characterized in that the mounting plate (1) possesses a vertical leg (1') and a horizontal leg (1").

10. The check weigher as claimed in claim 9, characterized in that supporting struts (12) are fastened to the fastening flange (2) of the horizontal leg (1") and of the weighing cell bracket (10) by means of clamping elements (15).

11. The check weigher as claimed in claim 3 characterized in that the fastening flange (2) possesses on its circumference a contour (13, 18, 19 or 20) projecting and set back in any desired modular dimension.

12. The check weigher as claimed in claim 4 characterized in that, for each fastening point, a holding element (14, 21, 22 or 23) fixed to the assembly plate (5) is provided, which, with the assembly plate (5) fastened, butts against the circumference of the fastening flange (2).

13. The check weigher as claimed in claim 12 characterized in that the holding element (14, 21, 22 or 23) possess a contour (13', 18', 19' or 20') which cooperates with the contour (13, 18, 19 or 20) of the fastening flange (2).

14. A check weigher comprising
a body comprising a rear side hollow body and a front side mounting plate which projects, at least in places, beyond said hollow body, at least on two sides which are opposite from one another, so that the projecting portions of said front side mounting plate constitute fastening flanges,
a weighing cell fastened to said body and secured, releasably, to said fastening flanges on the front side of said mounting plate, on the opposite side thereof from said rear side hollow body.

15. The check weigher claimed in claim 14 which further comprises an assembly plate and clamping elements, wherein said assembly plate is fastened, releasably, to said fastening flanges by said clamping elements and wherein said clamping elements clamp between them said fastening flanges at fastening points opposite each other on two opposite sides of said mounting plate.

16. The check weigher claimed in claim 15 wherein there is provided, on a circumference of each of said fastening flanges, a contour with projecting and set back portions.

17. The check weigher claimed in claim 16 which further comprises, for each fastening point, a holding element fixed to said assembly plate, wherein said holding elements butt against the circumferences of the fastening flanges when said assembly plate is fastened to said fastening flanges.

18. The check weigher claimed in claim 17 wherein said holding elements possess a contour which cooperates with the contour of the circumference of said fastening flange.

* * * * *